Dec. 8, 1959  G. E. COMSTOCK 3D., ET AL  2,915,918
AUTOMATIC BALANCING MECHANISM FOR
ROTATING ELEMENTS

Filed June 28, 1955 5 Sheets-Sheet 1

Fig. 1
Fig. 2

INVENTORS.
GEORGE E. COMSTOCK 3rd.
LENNART A. KASPARSON
BY
George Comstock
ATTORNEY

Fig.11

United States Patent Office 2,915,918
Patented Dec. 8, 1959

2,915,918

AUTOMATIC BALANCING MECHANISM FOR ROTATING ELEMENTS

George E. Comstock 3d, Holden, and Lennart A. Kasparson, Worcester, Mass., assignors to Norton Company, Worcester, Mass., a corporation of Massachusetts Application June 28, 1955, Serial No. 518,508

39 Claims. (Cl. 74—573)

The invention relates to balancing mechanism for rotating elements and has particular application to the balancing and rebalancing from time to time of a system including a grinding wheel and the machine tool spindle on which it is mounted since grinding wheels as at present made do not stay in dynamic balance as they are worn away or trued away in use.

One object of the invention is to provide a mechanism of the nature indicated which is readily adapted to be incorporated in a precision grinding machine without dislocation of its main operative parts or interference with the normal operation of such machine.

Another object of the invention is to improve the balancing mechanism described and illustrated in the application of George E. Comstock, 3d, Serial No. 514,264, filed June 9, 1955, now Patent No. 2,882,745. Another object is to provide simplified mechanical components for balancing systems and in this connection the mechanical apparatus hereof for moving mass in a rotational system from a fixed station outside of the system may be operated manually or in various manners other than by the particular electronic registering etc. mechanism herein described.

Another object is to provide mechanical actuating mechanism for moving a mass or masses in radial coordinates in a rotating system which also may be reciprocating. Another object is to provide a mechanism of the class referred to having relatively few parts which will not readily get out of order and involving one or more of levers, sleeves, operating bells, bell crank levers and springs or the like to keep a force or forces against the balancing mass to eliminate backlash in the system. Another object is to provide antifriction slipping connections between the outside non-rotating and/or non-reciprocating station and the balancing mass or masses within the rotating system.

Other objects will be in part obvious or in part pointed out hereinafter.

In the accompanying drawings illustrating one of many possible embodiments of the mechanical and electrical features of this invention.

Figures 1, 2:
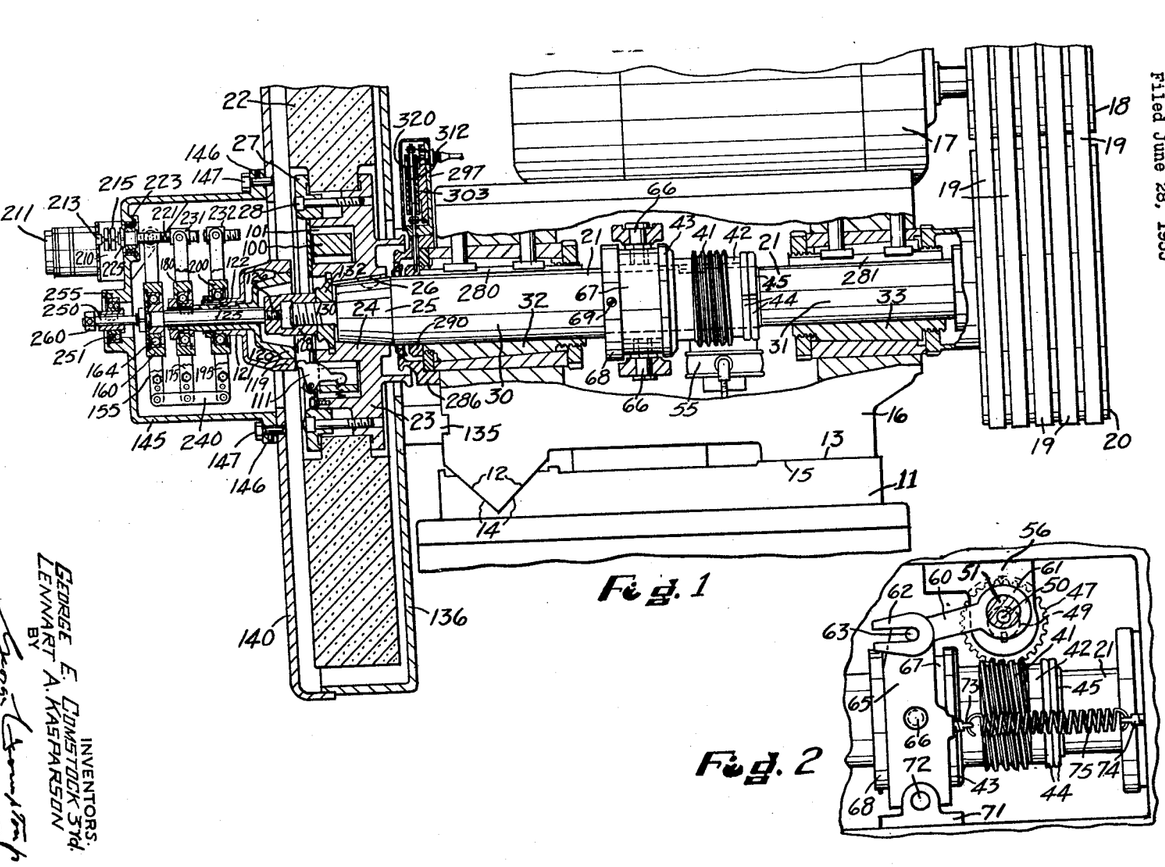
Figure 1 is a vertical sectional view of a grinding wheel, the spindle upon which it is mounted, the bearings and wheel head with the cross slide in which the spindle is mounted, a portion of the base of the machine and the mecanical instrumentalities for restoring balance, illustrating the application of the invention to a cylindrical grinding machine.
Figure 2 is a detail of the spindle reciprocating mechanism being a plan view thereof.

Referring now to Figure 1, the base 11 of a cylindrical grinding machine has V-ways 12 and a flat way 13 for the support of complementary V-ways 14 and a flat way 15 of a wheel head cross slide unit 16 supporting a driving motor 17 which by means of a driving pulley 18 and multiple V-belts 19 drives a pulley 20 secured to one end of a rather massive spindle 21 on the other end of which a grinding wheel 22 is supported by means of a driving flange 23 having a hub 24 mounted on the tapered front end 25 of the spindle 21 and keyed thereto by means of a key 26, the wheel 22 being clamped to the flange 23 by means of a ring 27 secured in place by means of bolts 28. The foregoing is typical of precision cylindrical grinders and so needs no further elaboration, it being understood that the invention is not limited to any particular type of mounting for a grinding wheel and, in its broader aspects, is not limited to the balancing of grinding wheels at all but may be used for balancing other rotating systems.

For a long time it has been standard practice to reciprocate the grinding wheel of a cylindrical grinder even when doing straight infeed cutting otherwise known as plunge cutting in order to break up the grinding lines and one of the problems in this invention is to apply and operate a rebalancing mechanism to a system which not only rotates but also reciprocates. The wheel spindle 21 has journal portions 30, 31, which are mounted for rotation and also for reciprocation in bearings 32, 33, and while the bearings 32 and 33 have many parts as illustrated in Figure 1, we will not further describe them as they are old in the art and have been illustrated and described in patents many times before.

Wheel spindle reciprocating mechanism is also old and well known but since it raises a particular problem in embodiment of this invention, we will briefly describe it as illustrated in Figures 1 and 2. A worm 41 is part of a sleeve 42 having a flange 43, and the sleeve 42 is mounted on the spindle 21 and secured in place by means of spanner nuts 44 on a threaded portion 45 of the spindle 21. The worm 41 meshes with a worm wheel 47 which is keyed to a vertical shaft 49 having an offset pin 50 supporting an adjustable eccentric 51 secured to the pin 50 by means of a set screw, not shown. The shaft 49 is journalled in an oil pump casing 55 on the lower end of a slotted casting 56 which is secured to the wheel head unit 16, and the casting 56 also journals the shaft 49. The oil pump is for the purpose of lubricating the bearings 32 and 33 and other parts of the machine but need not be further described herein.

An arm 60 has a collar 61 surrounding the eccentric 51 and at the other end the arm 60 has a fork 62 in which is located a pin 63 secured to a yoke 65 having pins 66 extending into a ring 67 whicvh fits between the flange 43 and a collar 68 mounted on the spindle 21 and secured thereto by means of a screw 69.

The yoke 65 is pivotally connected to the unit 16 by means of a bracket 71 and a pin 72 extending through the bracket 71 and the yoke 65. Screws 73 and 74 with holes in the end are secured respectively to the yoke 65 and to the unit 16 and between them extends a spring 75 which urges the yoke 65 to the right, Figure 2, thus keeping the pin 63 in the fork 62. It will be seen without further description that as the spindle 21 rotates, it reciprocates itself, and the amplitude of reciprocation can be varied by adjusting the eccentric 51 on the pin 50 and in fact the adjustment can be from zero reciprocation to the maximum with the adjustment as shown, the maximum being about 3/8 inch in a typical precision cylindrical grinder.

It will facilitate an understanding of the present invention to describe at this point in a general way how the balancing is achieved. The electronic mechanism, hereinafter described, has a pickup which responds to the vibration of the spindle 21 due to unbalance of the system and the signal from the pickup is amplified and detected to determine whether the balance is getting better or worse, that is to say whether the oscillations are increasing in amplitude which means that the balance is getting worse, or that the oscillations are decreasing in amplitude which means that the balance is getting better. The unbalance is conceived of as existing in two coordinates, and electric driving mechanism is provided to alter the value of the coordinates alternatively. The electric driving system is reversible and if the signal indicates balance getting better it is allowed to continue driving in the same angular direction but if the signal detected is that balance is getting worse, the electric driving mechanism is reversed. From time to time the electric driving system is switched from operating the one coordinate of balance to operating the other coordinate of balance and then switched back again and so on.

Figure 6:
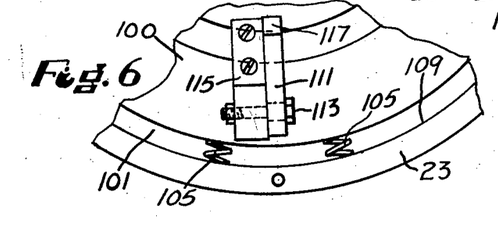
Figure 6 is an enlargement of the balancing apparatus shown at the bottom of Figure 4.

Coming now to the specific embodiment of the invention illustrated and described herein, one of the coordinates mentioned is embodied in the radius adjustment of a balancing ring 100 (Figures 1, 4 and 6) located in a wide groove 101 in the flange 23 illustrated in the left hand side of Figure 1. The other coordinate is embodied in the radius adjustment of the ring 100 at a substantial angle to the first radius adjustment. Ideally and illustratively these radius adjustments are perpendicular to each other, but they do not necessarily have to be exactly at 90 degrees to each other and anything better than 45 degrees relationship viewed from both directions would be operable. Conveniently the ring 100 is a symmetrical ring so that whenever it is concentric with the spindle 21 it exerts no correction of the balance but this need not be the case and if accidentally it were itself slightly out of balance it would nevertheless operate to rebalance the system exactly as if it were perfect.

The electric and mechanical instrumentalities of this system continually move the ring radially for a limited time in one coordinate while maintaining it fixed in the other coordinate. Then for another interval of time the ring 100 is moved radially in the second coordinate while maintained stationary in the first coordinate. It may thus be said that the ring 100 is continually hunting to achieve and to maintain good balance, and for a limited time it hunts in one coordinate and then, for a limited time, it hunts in the other coordinate.

As an illustrative practical embodiment of this system, the ring 100 is caused to hunt radially in one coordinate for fifteen seconds, then it is caused to hunt radially in the other coordinate for fifteen seconds, then again radially in the first coordinate for fifteen seconds, and so on while the machine is running. In the illustrative embodiment of the invention there are checks executed at intervals of three seconds, and the electronic mechanism responsive to the signal gives a command at the end of each three second interval. Thus by hunting continually and alternately in the two coordinates, the system hunts back and forth over the condition of perfect balance in each coordinate thus keeping the out of balance in a very small area near the center point in the coordinate system.

Figure 4:
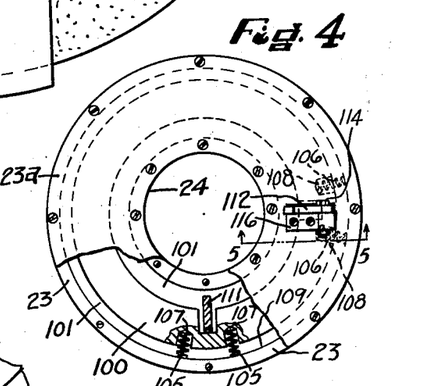
Figure 4 is an elevation of certain of the balance instrumentalities around the spindle and inside of the grinding wheel shown on a somewhat larger scale than in Figure 1.
Figure 5:
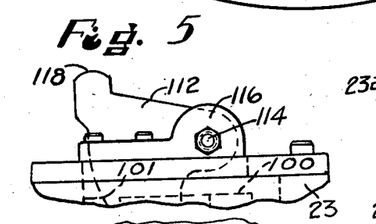
Figure 5 is a sectional view on an enlarged scale taken on the line 5—5 of Figure 4.

Referring now to Figures 1, 4, 5 and 6 the balancing ring is supported in the groove 101 by means of a pair of springs 105 and a pair of springs 106 extending into bores 107 and 108 in the ring 100 and backed up by the inner cylindrical surface 109 of the flange 23 which is part of the groove 101. The springs 105 are located on either side of a bell crank lever 111 and the springs 106 are located on either side of a bell crank lever 112 and these bell crank levers 111 and 112 are pivotally mounted by means of bolts 113 and 114 to brackets 115 and 116. The unit consisting of springs 105 in bores 107 with bell crank lever 111, pivot bolt 113 and bracket 115 is the same as the unit consisting of springs 106 in bores 108 with bell crank lever 112, pivot bolt 114 and bracket 116 except that the bell crank lever 112 is longer than the bell crank lever 111 in a radial direction. As shown in Figure 4, these two units are spaced 90 degrees apart circumferentially but could be spaced a little more or a little less in accordance with the explanation hereinbefore given. The brackets 115 and 116 rotate with the system and conveniently as shown in Figure 4 in the case of the bracket 116, are mounted on a plate 23a which is secured by screws to the flange 23 and its hub 24.

The bell crank lever 111 has a nose 117 and the bell crank lever 112 has a nose 118 and these noses are in engagement respectively with the ends of bells 119 and 120, see Figure 1, the bell 120 being inside of the bell 119. Assuming the bells 119 and 120 to be stationary, the ring 100 assumes a position responsive to the pressure of the springs 105 and 106 and held by the inner ends of the bell crank levers 111 and 112. Movement in either direction of the bell 119 will correspondingly move the ring 100 on a radius which is in the center plane of the bell crank 111, movement to the right in Figure 1 forcing this side of the ring 100 radially outward and the movement to the left of the bell 119 as seen in Figure 1 allowing the springs 105 to urge the portion of the ring 100 between the springs 105 radially inward. In similar fashion, movement of the bell 120 to the right as it is seen in Figure 1, moves that portion of the ring 100 between the springs 106 radially outward and movement of the bell 120 to the left, as is seen in Figure 1, moves that portion of the ring 100 between the springs 106 radially inward.

Figures 7, 10:
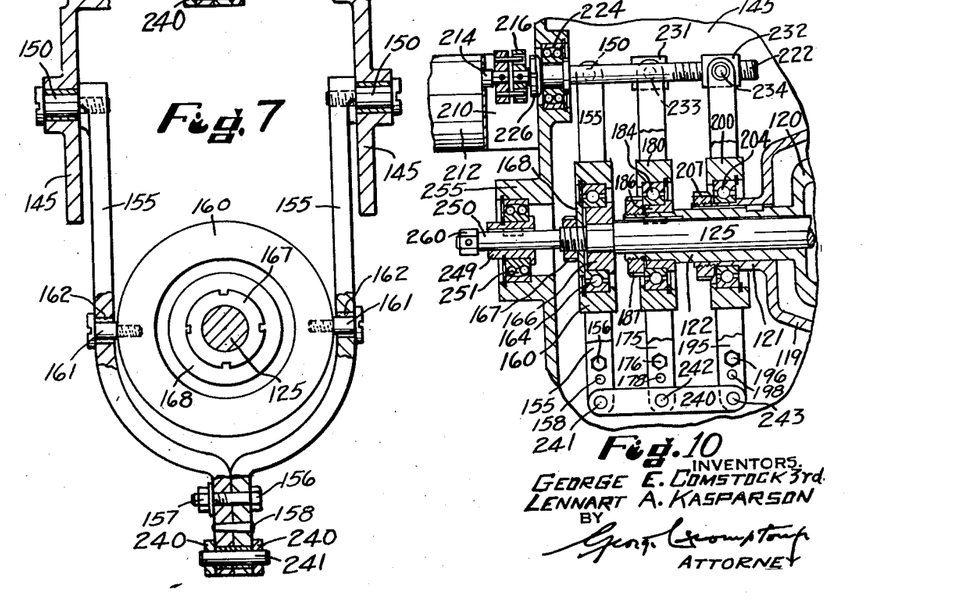
Figure 7 is an enlarged elevation, taken in an axial direction, of the lever which is oscillated by the reciprocations of the spindle and which, through a link, oscillates one fulcrum of two other levers which operate the co-ordinates of balancing.
Figure 10 is an enlarged sectional view of the mechanism shown in the left hand end of Figure 1.

Referring to Figures 1 and 10, the bell 119 has an integral sleeve 121 and the bell 120 has an integral sleeve 122. These sleeves are keyed together and they are also keyed to a shaft 125 which is attached by means of a threaded end 126 on the shaft 125 to a nut 128 that is in threaded engagement with the threaded end 130 of the spindle 21, an interposed washer 132 being located between the nut 128 and the hub portion 24 so that these parts can be tightened whereby the shaft 125 is in effect an extension of the spindle 21.

Figure 3:
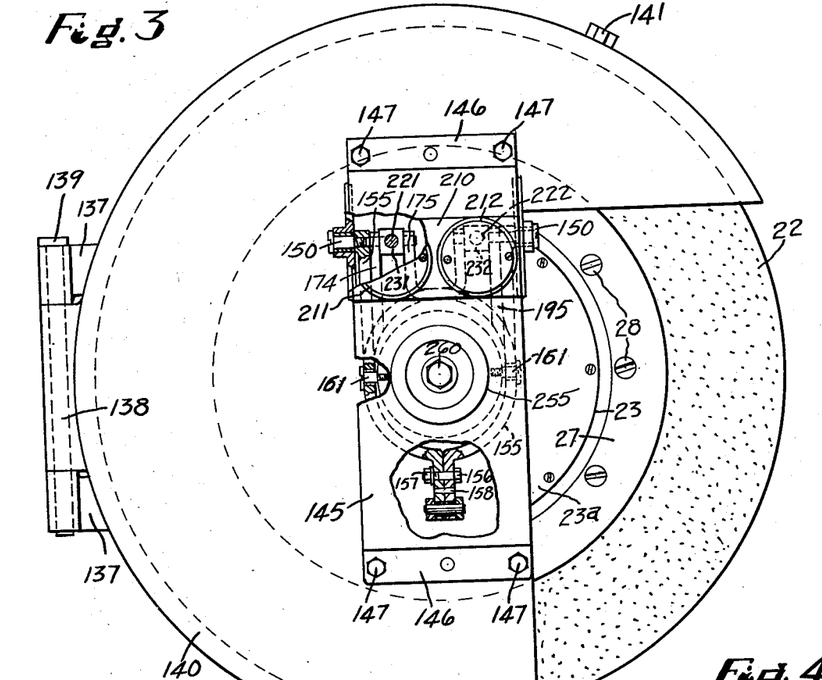
Figure 3 is an end elevation looking from the left hand side of Figure 1.

Referring to Figure 1, near the V-ways 12 in the lower left hand part of this figure is a lug 135 secured to the wheel head cross slide 16 which lug 135 is part of and supports an inner fixed wheel guard casing 136. Referring now to Figure 3, the inner wheel guard casing member 136 has, as shown in the left hand side of Figure 3, hinge members 137 which are connected to an interposed hinge member 138 by means of a hinge pin 139, the hinge member 138 being part of a door-like wheel guard member 140 which can be swung open after releasing a bolt 141 which normally secures together the door 140 and the fixed wheel guard member 136.

Referring now to the central portion of Figure 3 and to the left hand end of Figure 1, an open casing 145 has flanges 146 which are secured by means of bolts 147 to the door-like wheel guard member 140. Referring now to Figure 7, pivot bolts 150 extend through walls of the casing 145 into a pair of lever arms 155 which are joined at the bottom by means of a bolt 156, a nut 157 and a dowel pin 158 so as to form a single lever in the shape of a fork. A collar 160 has pivot bolts 161 screwed into it and the bolts 161 extend through oversized holes 162 in the arms 155. Referring to Figure 10, the collar 160 is supported by a ball bearing 164 the inner race of which is secured by means of an inner collar 166, a nut 167 and a washer 168 to the shaft 125 which is threaded at this point.

Figure 8:
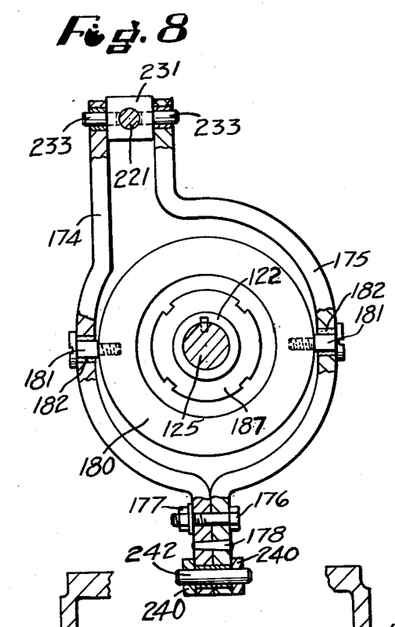
Figures 8 and 9 are enlarged elevations, taken in an axial direction, of the aforesaid two other levers.

Referring now to Figures 8 and 10, a pair of lever arms 174 and 175 are joined at the bottom by means of a bolt 176, a nut 177 and a dowel pin 178 so as to form a single lever in the shape of an offset fork. A collar 180 has pivot bolts 181 screwed into it and the bolts 181 extend through oversized holes 182 in the arms 174 and 175. The collar 180 is supported by a ball bearing 184 the inner race of which is secured by means of an inner collar 186 and a nut 187 to the sleeve 122 which is threaded at the left hand end.

Figure 9:
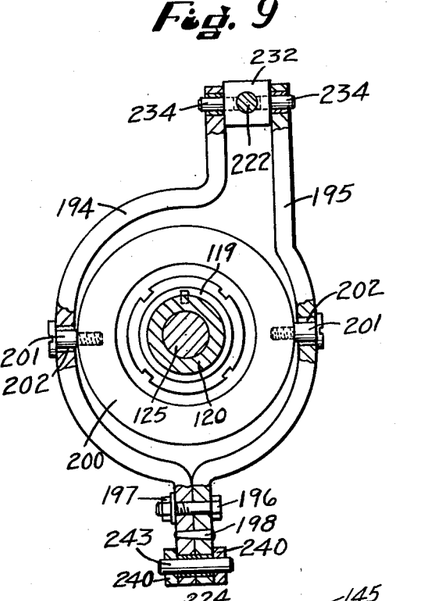

Referring now to Figures 9 and 10, a pair of lever arms 194 and 195 are joined at the bottom by means of a bolt 196, a nut 197 and a dowel pin 198 so as to form a single lever in the shape of an offset fork. A collar 200 has pivot bolts 201 screwed into it and the bolts 201 extend through oversized holes 202 in the arms 194 and 195. The collar 200 is supported by a ball bearing 204 the inner race of which is secured by means of a nut 207 to the sleeve 121 which is threaded at the left hand end.

Referring now to Figures 1, 3 and 10, a bracket 210 is secured to the outside of the casing 145, this bracket being U-shaped and the wall thereof parallel to the front of the casing being shown in section in Figures 1 and 10 in order to disclose the driving connections therein. A pair of motors 211 and 212 are secured to the vertical wall of the bracket 210 that is shown in section and these are the electric driving mechanism to alter the value of the coordinates previously referred to. In the illustrative embodiment, for fifteen seconds the motor 211 will be running, then it will be stopped and for fifteen seconds the motor 212 will be running, then it will be stopped and for fifteen seconds the motor 211 will be running, and so on. These motors are reversible and will run in the direction to make the balance better as checked at three second intervals.

In Figure 1 the motor 211 is shown in elevation whereas in Figure 10 the motor 212 is shown in elevation, and this is for the purpose of separately showing the operative mechanism. The motors 211 and 212 have incorporated therein speed reduction gearing which it is not necessary to illustrate since motors with speed reduction gearing built therein can be readily purchased nowadays. In the illustrative embodiment of the invention the output shafts 213 and 214 of the motors 211 and 212 respectively are driven at a speed of two revolutions per minute. Referring to Figure 1, the output shaft 213 of the motor 211 drives a universal joint 215. Referring to Figure 10, the output shaft 214 of the motor 212 drives a universal joint 216. The universal joints 215 and 216 are of the same construction the latter being shown in section in Figure 10. The universal joint 215 is connected to a screw shaft 221 and the universal joint 216 is connected to a screw shaft 222, the former being journalled in a self-aligning ball bearing 223 and the latter being journalled in a self-aligning ball bearing 224, these bearings being of the same construction and Figure 10 showing the bearing 224 on a larger scale. Nuts 225 and 226 on the shafts 221 and 222 hold the inner races of the ball bearings 223 and 224 in place.

Referring to Figures 1 and 3, the screw shaft 221 extends through a nut 231 and referring to Figure 10, the screw shaft 222 extends through a nut 232. Referring to Figure 8, the nut 231 is square and is pivotally connected by pins 233 to the arms 174 and 175 which constitute an offset lever as already explained. Referring to Figure 9, the nut 232 is likewise square and is pivotally connected by means of pins 234 to the arms 194 and 195 which also constitute a lever as explained. Referring now to Figures 1, 7, 8, 9 and 10, the three levers 155, 174—175 and 194—195 are connected together by links 240 having pins 241 extending therethrough and through the bottoms of the lever arms 155 below the dowel pins 158, having pins 242 extending therethrough and through the bottoms of the arms 174 and 175 below the dowel pins 178, and having pins 243 extending therethrough and through the arms 194 and 195 below the dowel pins 198.

For supporting the front of the shaft 125 as best shown in Figure 10 but also as indicated in Figure 1, we provide a sleeve 249 which is keyed to the front end 250 of the shaft 125, the sleeve 249 supporting the inner race of a self-aligning ball bearing 251 supported in a hub 255 on the front of the casing 145. Pinned to the end of the portion 250 is a nut 260 by means of which the shaft 125 can be turned and when it is turned the threaded end 126 can be screwed out of the nut 128 to disconnect the parts so that the door 140 can be opened. Because of the fact that it is conventional to have the grinding wheel where it engages the workpiece moving downwardly, and in order that the rotation of the spindle 21 shall not tend to unscrew the nut 128 from the threaded end 126, the latter should have a left hand thread.

It will now be seen that as the spindle 21 reciprocates, the shaft 125 is likewise reciprocated, and so therefore the ball bearings 164, 184 and 204 are reciprocated and so also are the collars 160, 180 and 200. By reason of the lever connections including the links 240, and by reason of the fact that the lever 155 has stationary pivots 150, the levers 155, 174—175 and 194—195 are oscillated in such a manner that the nuts 231 and 232 remain stationary if the motors 211 and 212 are not operating. This condition pertains of course at moments of reversal of the motors respectively. But when the motor 211 or 212 is revolving its shaft 213 or 214, the corresponding nut 231 or 232 is moved in one direction or the other, which swings the lever 174—175 or 194—195 relative to the system to move the bell 119 or 120 to actuate the bell crank lever 111 or 112 against the springs 105 or 106 or to allow the springs 105 or 106 to react against a withdrawing bell. By reason of the use of springs to press the bell crank levers against the bells the system is under pressure and backlash is eliminated. By reason of the oversized holes 162, 182 and 202, binding due to translation of oscillations into reciprocations is avoided. By reason of the provision of the self-aliging ball bearings 223 and 224 and the universal joints 215 and 216, bending of the shafts 221 and 222 is precluded. In fact by the mechanism shown, rotary motion from a stationary source is caused to make adjustments in a reciprocating system and also in a rotary system. It will be seen that the bells 119 and 120 revolve with the system so there is no friction between them and the bell crank levers 111 and 112. However, it is convenient to provide bells rather than mere arms because then no special precautions have to be taken to be sure that parts are in engagement when they are coupled together and furthermore the bells being symmetrical are themselves in balance or as nearly so as they may be manufactured.

Figure 14:
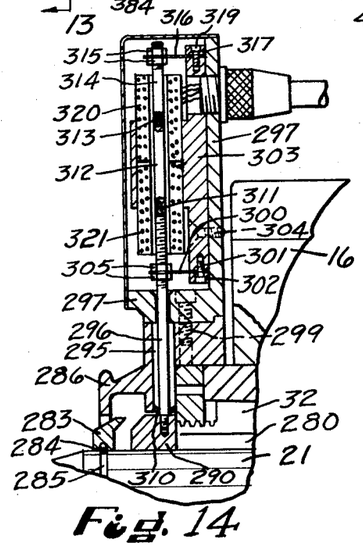
Figure 14 is an enlargement in vertical section of the pickup device of Figure 1 to pick up the vibrations of the spindle.

Referring now to Figures 1 and 14, the oil pumped by the oil pump 55 is conducted to oil spaces 280 and 281 in the bearings 32 and 33 by conduits not shown as this is well known in the art. In the case of the bearing 32 and oil space 280, the oil is sent back to circulation by means of an oil slinger ring 283 secured by a snap ring 284 in a groove 285 of the spindle 21 and is picked up by an oil collector ring 286 whence by other conduits not shown it is returned to a sump not shown from which the pump 55 draws it.

We provide a pickup ring 290 mounted on the journal portion of the spindle 21 and as seen it is located between the oil space 280 and the slinger ring 283 so therefore oil is running underneath it as it has to have a clearance from the spindle 21 being a stationary ring. This clearance is sufficient to allow a free running fit but not great enough to avoid picking up the vibrations of the spindle 21 and conveniently we have found that a clearance of about half a thousandth on the radius is good. Therefore, the pickup ring 290 which can be made of bronze to provide dissimilar metal contact vibrates as the spindle 21 vibrates and the oil film which keeps the ring 290 and the spindle 21 out of actual metallic contact constitutes an hydraulic medium for the transmission of the vibrations. These vibrations will naturally occur in every vector of plane of rotation of the spindle 21 but there will always be a component in any given vector and illustratively the vibrations in the vertical direction are those that are picked up by the ring 290 and transmitted to the detecting mechanism.

The oil collector ring 286 is secured in any suitable manner to the slide 16, as by means of bolts not shown. It has a vertical bore 295 through which extends a pickup rod 296 that extends also through a vertical bore in a casing 297 secured by bolts 299 to the collector ring 286. The upper end of the pickup rod 296 is threaded and passes through a flat spring 300 secured by means of a screw 301 and a block 302 to a plate 303 secured by screws 304 to the casing 297, the flat spring 300 being also secured by nuts 305 to the rod 296. At the bottom bore 295 is constricted at 310. This construction, which could be varied, allows the rod 296 to move up and down but prevents other movement except a very slight lateral component which, since the movement is a fraction of a thousandth of an inch can practically be disregarded.

The upper end of the pickup rod 296 is connected by a screw connection 311 to a permanent magnet core 312 which is connected by a screw connection 313 to a supporting rod 314 which is threaded at the upper end and has nuts 315 surrounding a flat spring 316 secured by a block 317 and a screw 319 to the plate 303. This provides further support for the system consisting of the pickup rod 296, the supporting rod 314 and the permanent magnet core 312. The rods 296 and 314 are preferably made of non-permeable material so that the magnetic field created by the permanent magnet core 312 extends from end to end thereof and through a pair of windings 320 and 321 located one above the other. The core 312 is a bar magnet with opposite poles at the ends.

By reason of the fact that there are two windings 320 and 321 with a division between them mid-way between the poles of the magnet 312, and by reverse connection of these coils into the system as will be hereinafter pointed out, vibration in a vertical direction of the magnet core 312 induces an electromotive force in the pair of coils 320 and 321. This is amplified and detected and caused to give the commands hereinbefore mentioned in a manner which will now be explained.

The output voltage of windings 320 and 321 is instantaneously proportional to the velocity at that instant of the permanent magnet core 312. When an unbalance exists in the apparatus including the grinding wheel 22, the mounting flange 23 and their associated parts mounted on spindle 21, a centrifugal force directed radially from the center of rotation of the spindle 21 through the center of gravity of the rotating system and proportional in magnitude to its unbalance moment and to the square of rotational speed of the spindle 21 causes the geometric center of the spindle 21 to move eccentrically in a circular locus about the center of rotation of the system at a rotational speed equal to that of the spindle 21. This eccentric motion has a vertical component which is a displacement sinusoidally varying in time, the sinusoidal amplitude being equal to the radial eccentricity of the geometric center of spindle 21 relative to the center of rotation, and having a frequency equal to the rotational speed of spindle 21. Thus pickup ring 290 imparts to pickup rod 296 a sinusoidal movement of the above character, this movement being in turn transmitted to the permanent magnet core 312.

Thus the output voltage from windings 320 and 321 which are connected back to back to secure an addition of the E.M.F.'s generated by the north and south poles respectively of permanent magnet core 312 is a sinusoidal voltage wave form whose amplitude is proportional to the product of the displacement amplitude times the circular frequency of the oscillation of the magnet core 312, and having a frequency equal to said frequency.

Figure 11:
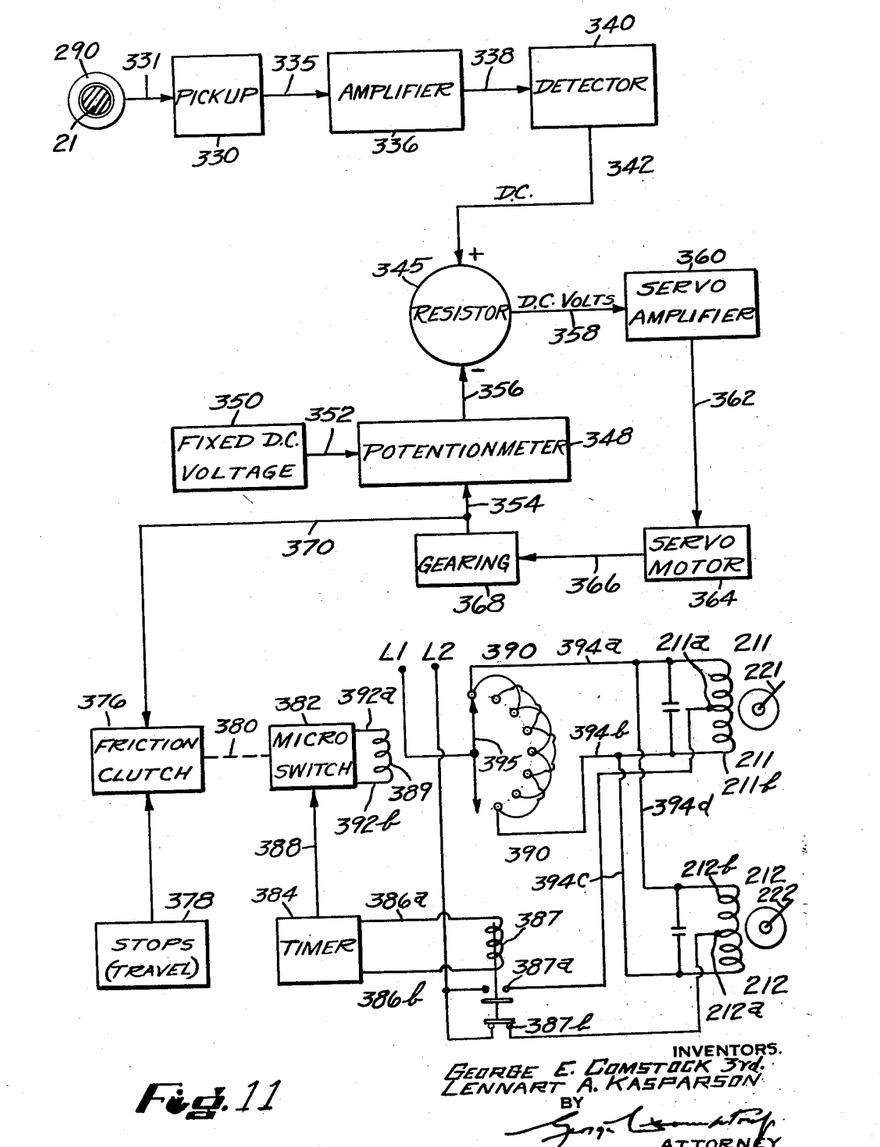
Figure 11 is a block diagram illustrating the electronic actuating mechanism.

Referring now to Figure 11, in the upper left hand corner we show in section the spindle 21 and coaxial therewith pickup ring 290. The pickup 330 of Figure 11, comprising the coils 320 and 321 and the permanent magnet core 312 of Figure 14, is shown connected to pickup ring 290 by line 331 which represents the pickup rod 296 and associated components of Figure 14 serving to actuate permanent magnet core 312. The output of pickup 330 is, as described above, a sinusoidally varying voltage, that is to say an alternating current voltage, which is connected by line 335 to an A.C. amplifier 336 of Figure 11 whereby the relatively small output voltage from the pickup is amplified to a voltage level suitable for use in the remainder of the control circuit. A typical output voltage level from the pickup may be of the order of 100 microvolts R.M.S., whereas a corresponding voltage level of the order of 50 volts R.M.S. may be desirable for actuating the remainder of the control circuit. The alternating current output voltage of amplifier 336 is connected by a line 338 to detector 340 where it is rectified and filtered to provide a smooth direct current output from detector 340 which is connected by line 342 to a summing resistor 345.

Directly below resistor 345 in Figure 11 is potentiometer 348 which is excited with a fixed direct current voltage derived from voltage source 350 shown connected to potentiometer 348 by line 352 of Figure 11. The output voltage of potentiometer 348 is a fraction of the fixed input voltage supplied by voltage source 350 proportional to the angular setting of the mechanical input to potentiometer 348 which is physically a shaft and is represented in Figure 11 by a line 354. This output voltage from potentiometer 348 is connected by line 356 to the summing resistor 345 and is of polarity opposite to that of the detector output voltage. The resistance of summing resistor 345 is so chosen in relation to the output impedance value of detector 340 and potentiometer 348, that nearly linear summing action is secured, its resistance being several times lower than said output impedances. Thus the net D.C. voltage appearing across resistor 345, this voltage constituting its output, is proportional to the difference between the input voltages on lines 342 and 356, its polarity being the same as the polarity of the larger of the two input signals. This D.C. output voltage is connected by a line 358 to a servo amplifier 360 whose output on line 362 drives servo motor 364. The output of servo motor 364 is a shaft rotation which is connected by line 366 through gearing 368 to the input shaft of potentiometer 348 as shown by line 354 of Figure 11. The direction of rotation of servo motor 364 in response to an input signal on line 358 to the servo amplifier 360 is such that the potentiometer 348 is driven in a direction which will minimize the input voltage on line 358, that is to say the potentiometer 348 is driven in such a direction that the voltage appearing on line 356 is made equal and opposite to the voltage appearing on line 342.

Thus if the voltage on line 342 is changing the servo motor 364 drives potentiometer 348 so that its output voltage on line 356 is changing at the same rate as the output voltage of detector 340. If the output voltage of detector 340 is increasing in magnitude then the direction of rotation of potentiometer 348 is such that its output voltage is increasing in magnitude.

Therefore since the output voltage of detector 340 is proportional to the output voltage of pickup 330, which in turn is proportional to the amplitude of the eccentric motion of spindle 21, and since this is proportional to the degree of unbalance of the rotating system mounted on spindle 21, the angular position of the shaft of potentiometer 348 is maintained at all times proportional to the degree of unbalance of the rotating system.

Figure 12:
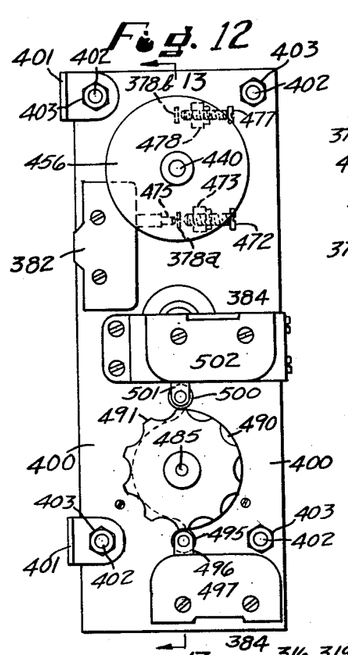
Figure 12 is a front elevation of an assembly of the servo motor, potentiometer, gears, friction clutch, micro switch, timer and stops illustrated in Figure 11.
Figure 13:
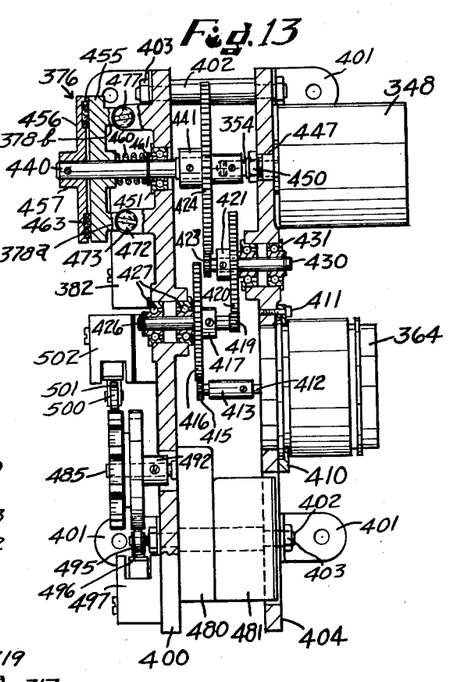
Figure 13 is a view partly in cross section taken on the line 13—13 of Figure 12.

Line (shaft) 354 which represents the mechanical drive from gearing 368 to the shaft of potentiometer 348 is also connected by a line (shaft) 370 to a friction clutch 376 to be described more fully in connection with Figures 12 and 13. While the input member of friction clutch 376 is free to rotate continuously as dictated by input 370, its output member is constrained by stops 378 to a small angular displacement for example 10° of arc; thus if the mechanical input 370 turns continuously counter-clockwise the output member of friction clutch 376 will be stalled against the counter-clockwise stop, whereas for continuous clockwise rotation of mechanical input of 370 the output member of friction clutch 376 is stalled against the clockwise stop. We provide a suitable mechanical actuating means indicated in Figure 11 by line 380 for operating a micro switch 382 in response to the angular position of the output member of friction clutch 376 in such a manner that the micro switch is closed when the output member of the friction clutch approaches and reaches one of the stops and is otherwise opened. We provide a timer 384 which at regular intervals energizes and deenergizes a relay coil 387 the interconnection between timer 384 and relay coil 387 being along lines 386a and 386b of Figure 11. A typical operating sequence of relay coil 387 under the command of timer 384 is: energized for 15 seconds deenergized for the subsequent 15 second period, energized for the next 15 seconds and so on.

Timer 384 also controls the electrical input to micro switch 382 the interconnection being along line 388. Micro switch 382 energizes the stepping magnet 389 of a stepping switch 390 through the lines 392a and 392b when and only when two conditions occur simultaneously, namely, when micro switch 382 is in its closed position and timer 384 is supplying an electrical input to micro switch 382. Timer 384 periodically supplies and removes excitation along line 388 at a rate which is of the the order of from three to five times as fast as the cycling rate supplied on lines 386. Thus for example with a 15 second "on," 15 second "off" cycle of coil 387, electrical energy may be supplied to micro switch 382 on a 3 second "on," 3 second "off" cycle.

Stepping switch 390 is connected by lines 394a and 394b to the two phase capacitor type reversible balancing motor 211 (see also Figures 1 and 3) and is connected by lines 394c and 394d to the balancing motor 212. The center point 211a of the stator winding 211b of motor 211 is connected to a normally open switch 387a of a relay whose operating coil is coil 387. Similarly the center point 212a of the stator winding 212b of motor 212 is connected to a normally closed switch 387b of the relay 387. Both switches are connected to one side, L2, of a single phase alternating current power source of suitable voltage and frequency rating for motors 211 and 212. The other side of this power source, L1, connects to the wiper arm 395 of the contact bank of stepping switch 390. Alternate contacts of this contact assembly are connected to lines 394a and 394d, and the remainder of the contacts of stepping switch 390 are connected to line 394b and thence to line 394c as shown in Figure 11. Thus in successive positions of wiper arm 395 alternate sides of the stator windings 211b and 212b are connected to line L1 whereby with connection of either center tap 211a or 212a through the switches of relay 387, motors 211 and 212 are driven alternately in opposite directions, while the relay 387 determines by the open and closed conditions of its switches which of the two motors 211 and 212 is energized at any one time.

As described above the position of shaft 354 is proportional angularly to the unbalance of the rotating mechanism mounted on spindle 21. If the unbalance is being reduced by a balancing motor 211 or 212 turning in the appropriate direction whereby to reduce the unbalance, shaft 370 rotates continuously in one direction and thus the output member of friction clutch 376 is stalled continuously on one of its stops. The mounting of the micro switch 382 is such that under these conditions the micro switch 382 is opened. Therefore, the electrical signals from timer 384 along line 388 do not reach stepping switch 390 which therefore does not step, thus permiting a balancing motor to continue rotation in the direction which reduces the degree of unbalance.

However, should a balancing motor be turning in such a direction that the degree of unbalance is increasing, then friction clutch 376 is turning in the opposite direction, its output member is stalled against the opposite stop, and micro switch 382 is closed. Under these conditions the receipt of a timing signal on line 388 causes stepping switch 390 to step, thus reversing the direction of rotation of a balancing motor, which causes the degree of unbalance to begin to diminish, friction clutch 376 reverses in direction of rotation, micro switch 382 opens and stepping switch 390 is unaffected by the next timing signal on line 388. The frequency of repetition of timing signals on line 388 is determined by the rapidity with which the micro switch 382 opens upon reversal of a balancing motor; for example if the micro switch 382 opens 1½ seconds after reversal of a motor, the timing period could be as short as slightly more than 1½ seconds, therefore selection of a period of 3 seconds allows ample margin of safety.

As a result of the action described above, a balancing motor drives the system to the point of best balance with respect to the coordinate along which adjustment is being effected. As relay 387 is periodically energized and deenergized the balancing motor action is transferred from one coordinate of balancing to the other, and since the period of energization of relay 387 is several times longer than the interval between timing signals supplied to micro switch 382, the balancing motors are enabled to establish an optimum balance or an approach to optimum balance in first one coordinate of balancing and then in the other. Thus the system continuously searches about the point of best balance compensating for small changes in the position of the center of gravity of the rotating members mounted on spindle 21 as they occur.

Referring now to Figures 12 and 13, secured to any convenient part of the grinder such as to the electrical control panel, not shown, which contains the electrical mechanism hereinbefore described, is a plate 400 having brackets 401 for mounting as aforesaid and connected by a stud 402 with nuts 403 to a second plate 404 thus constituting a framework for the mounting of two separate mechanisms of those which have been previously described in diagram. Secured by means of a clamp 410 and screws 411 to the plate 404 is the servo motor 364 which has a shaft 412 coupled by a coupling 413 to a pinion gear 415 which drives a spur gear 416 coupled by its hub 417 to a pinion gear 419 which meshes with a spur gear 420 coupled by its hub 421 to a pinion gear 423 which meshes with a spur gear 424. The pinion gear 419 is mounted on a shaft 426 which extends through the hub 417 and the shaft 426 is journalled in ball bearings 427 mounted in the plate 400. Similarly pinion gear 423 is mounted on a shaft 430 extending through the hub 421 and the shaft 430 is journalled on ball bearings 431. It will thus be seen that the servo motor 364 drives the spur gear 424 at a much reduced rate of revolution, illustratively at about 1/200 of the r.p.m. of the motor 364.

The gear 424 is coupled to the potentiometer 348 and also to the friction clutch 376. Constructionally a shaft 440 extends through the hub 441 of the gear 424 and the hub 441 is fastened to the shaft 440 as by a set screw. The right hand end of the hub 441 is bored to receive the shaft (line) 354 of the potentiometer 348. This shaft 354 extends through a hub 447 of the casing of the potentiometer 348 and the hub 447 extends into a hole in the plate 404 while a nut 450 screwed onto the end of the hub 447 holds the potentiometer in place thus mounting it on the plate 404.

The shaft 440 extends leftwardly through a ball bearing 451 mounted in the plate 400 and extends through a friction disc 455 and into a second friction disc 456 having a hub 457 to which the shaft 440 is connected by a set screw. A spring 460 extending between disc 455 and a washer 461 which is backed up by the ball bearing 451, urges the disc 455 to the left. Friction pads 463 of some soft material such as cork are preferably provided between the discs 455 and 456, as friction between metal and cork is more uniform than between metal and metal. The disc 456 is the input member of the friction clutch 376 while the disc 455 is the output member thereof.

Secured to the output disc 455 is a pair of stops 378a and 378b which conveniently are 180° apart on the disc. The stop 378a is located between a stationary screw 472 extending through a boss 473 projecting from the plate 400 and the operating rod 475 of the micro switch 382. Thus reversals of the servo motor 364 move the stop 378a back and forth between the screw 472 and the rod 475. Owing to the short distance between the screw 472 and the rod 475, reversal in the direction to carry the stop 378a against the rod 475 does not precede by a great deal the actuation of the rod 475. The stop 378b is positioned close to a screw 477 which extends through a boss 478 projecting from the plate 400 and serves merely to relieve the rod 475 of excessive load by limiting the travel of the stop 378a, since the micro switch 382 is a delicate mechanism.

Secured to the plate 400 is a gear box 480 connected to the timer motor 481 which with the other mechanism is identified in Figure 11 as the timer 384. The gearing in box 480 illustratively reduces the output from the motor to about 2 r.p.m. The output shaft from the gear box 480 is indicated by the numeral 485 and, extending through a hole in the plate 400, extends further through cams 490 and 491, the latter being secured to the former and the cam 490 having a hub 492 and being secured to shaft 485 by means of a set screw. The cam 490 has one lobe extending 180° circumferentially as indicated in Figure 12. It operates a roller 495 on the end of a rod 496 which is part of a micro switch 497 and this micro switch 497 actuates the relay coil 387.

The cam 491 has 10 lobes, and actuates a roller 500 on the end of a rod 501 which is part of a micro switch 502 which provides electrical energy for the micro switch 382. The micro switches 502 and 383 are connected in series so that the magnet of stepping switch 390 is energized only if both are closed. The circuit, of course, includes a source of power connecting these two switches in series with the stepping magnet.

In further description of the function of the timer, and in particular of cam 491 and switch 502, it is desirable to limit the times at which stepping magnet 389 can be energized, even though switch 382 may be closed, in order to reduce the effect of noise upon the control action. Since the pickup and amplifying systems are extremely sensitive, even to very small disturbances, they might respond to spurious signals causing false actuation of switch 382. If every small disturbance were permitted to affect the direction of rotation of a balancing motor it might hunt ambiguously this way and that without producing effective control action. However, the timer switch 502 samples or tests the condition of micro switch 382 only at intervals, and it is only at the moments of actuation of switch 502 that the stepping magnet can be energized. Therefore the effect of noise disturbances is minimized and the stepping magnet is energized only as a result of a definite trend toward increasing unbalance. Similarly, after reversal of a balancing motor a period of time elapses during which the balancing motor can take up the unavoidable backlash of the mechanical system and can begin to improve the balance (thereby releasing micro-switch 382) before another sampling check is made.

The ring 100 is movable mass in the rotatable system and it is movable in two radial coordinates which change the balance of the system. While the ring 100 as shown is a single integral piece, a pair of separately movable masses might be substituted.

The bell crank levers 111 and 112 with their mountings are mechanical devices in the system each one moving the mass in one coordinate, the two coordinates being so related that any unbalance can be corrected by movement of the mass in the proper direction in each coordinate.

The lever arms 174 and 175, 194 and 195, each pair constituting a lever are actuating devices outside of the system and non-rotating with respect to the system. They are connected through the ball bearings 184 and 204, the sleeves 122 and 121 and the bells 120 and 119 to the actuating devices which are the bell chank levers 111 and 112 and their supports. These connections are rotational slipping connections.

The springs 105 and 106 constitute means constantly exerting forces on the ring 100 which is a mass and which corrects the unbalance in the manner described. Other means exerting force could be substituted, for example pneumatic means or magnetism. The bells 119 and 120 are annular concentric members one in contact with one bell crank lever and the other in contact with the other bell crank lever, each of which are referred to as mechanical devices.

It will be seen that the balancing mechanism can have means embodied in the lever 155 and the ball bearing 164 and the links 240 for reciprocating the rotational slipping connections in harmony with the system when it reciprocates. For non-reciprocating systems this feature can be omitted and in the embodiments described it is automatically put out of action when the spindle reicprocator is placed in a neutral non-reciprocating condition.

The balancing mechanism in its automatic form has apparatus illustrated in Figure 11 and fully described registering whether unbalance is increasing or diminishing. It has reversible power means embodied in the motors 211 and 212, the screw shafts 221 and 222 and the nuts 231 and 232 for selectively operating the actuating devices. The balancing mechanism in its automatic embodiment as described in connection with Figure 11 also has means to reverse the power means from time to time when the registering apparatus indicates that unbalance is increasing.

It will thus be seen that there has been provided by this invention an automatic balancing mechanism for rotating elements in which the various objects hereinabove set forth together with many thoroughly practical advantages are achieved. As many possible embodiments might be made of the above invention and as many changes might be made in the embodiments above set forth, it is to be understood that all matter hereinbefore set forth or shown in the accompanying drawings is to be interpreted as illustrative and not in a limiting sense.

One embodiment of the invention has been described and illustrated. The electrical including the electronic mechanisms can be widely varied and variations thereof will be found described and illustrated in an application filed by one of us, Comstock, with the same title, on June 9, 1955, Serial No. 514,264, now Patent No. 2,882,-745. That copending application also elucidates the electronic mechanism in greater detail but it is not believed to be necessary to go into such detail herein since the main features of the present invention are the mechanical feaetures insofar as they differ from the mechanical features of the above identified copending application.

We claim:

1. A balancing mechanism for rotating elements comprising a rotatable system, movable mass in said system movable in two radial coordinates to change the balance of said system, a first mechanical device in said system to move the mass in one of said coordinates, a second mechanical device in said system to move the mass in the other of said coordinates, said coordinates being so related that any unbalance can be corrected by movement of the mass in the proper direction in each coordinate, a first actuating device outside of said system and non-rotating with respect to said system, a second actuating device outside of said system and non-rotating with respect to said system, a first rotational slipping connection between said first mechanical device and said first actuating device to operate the former from the latter, and a second rotational slipping connection between said second mechanical device and said second actuating device to operate the former from the latter.

2. A balancing mechanism according to claim 1 in which the mechanical devices are levers and movement of the mass in the coordinates by said levers is opposed by means constantly exerting forces on said mass.

3. A balancing mechanism according to claim 2 in which the actuating devices outside of said system include levers.

4. A balancing mechanism according to claim 3 in which the rotational slipping connections include annular concentric members one in contact with the first mechanical device and the other in contact with the second mechanical device.

5. A balancing mechanism according to claim 4 in which the rotatable system is reciprocable, said balancing mechanism having also means for reciprocating the rotational slipping connections in harmony with the system when it reciprocates.

6. A balancing mechanism according to claim 5 having registering apparatus registering whether unbalance is increasing or diminishing, reversible power means, means selectively to operate the first and second actuating devices from said reversible power means and means to reverse said power means from time to time when the registering apparatus indicates that the unbalance is increasing.

7. A balancing mechanism according to claim 1 in which the actuating devices outside of said system include levers.

8. A balancing mechanism according to claim 7 in which the rotational slipping connections include annular concentric members one in contact with the first mechanical device and the other in contact with the second mechanical device.

9. A balancing mechanism according to claim 8 in which the rotatable system is reciprocable, said balancing mechanism having also means for reciprocating the rotational slipping connections in harmony with the system when it reciprocates.

10. A balancing mechanism according to claim 9 having registering apparatus registering whether unbalance is increasing or diminishing, reversible power means, means selectively to operate the first and second actuating devices from said reversible power means and means to reverse said power means from time to time when the registering apparatus indicates that the unbalance is increasing.

11. A balancing mechanism according to claim 1 in which the rotational slipping connections include annular concentric members one in contact with the first mechanical device and the other in contact with the second mechanical device.

12. A balancing mechanism according to claim 11 in which the rotatable system is reciprocable, said balancing mechanism having also means for reciprocating the rotational slipping connections in harmony with the system when it reciprocates.

13. A balancing mechanism according to claim 1 in which the rotatable system is reciprocable, said balancing mechanism having also means for reciprocating the rotational slipping connections in harmony with the system when it reciprocates.

14. A balancing mechanism according to claim 13 in which the mechanical devices are levers and movement of the mass in the coordinates by said levers is opposed by means constantly exerting forces on said mass.

15. A balancing mechanism according to claim 14 in which the actuating devices outside of said system include levers.

16. A balancing mechanism according to claim 15 in which the rotational slipping connections include annular concentric members one in contact with the first mechanical device and the other in contact with the second mechanical device.

17. A balancing mechanism according to claim 1 in which the rotational slipping connections include annular concentric members one in contact with the first mechanical device and the other in contact with the second mechanical device and in which the mechanical devices are levers and movement of the mass in the coordinates by said levers is opposed by means constantly exerting forces on said mass.

18. A balancing mechanism according to claim 17 having registering apparatus registering whether unbalance is increasing or diminishing, reversible power means, means selectively to operate the first and second actuating devices from said reversible power means and means to reverse said power means from time to time when the registering apparatus indicates that the unbalance is increasing.

19. A balancing mechanism according to claim 18 in which the rotatable system is reciprocable, said balancing mechanism having also means for reciprocating the rotational slipping connections in harmony with the system when it reciprocates.

20. A balancing mechanism according to claim 1 in which the actuating devices outside of said system include levers and in which the rotatable system is reciprocable, said balancing mechanism having also means for reciprocating the rotational slipping connections in harmony with the system when it reciprocates.

21. A balancing mechanism according to claim 20 having registering apparatus registering whether unbalance is increasing or diminishing, reversible power means, means selectively to operate the first and second actuating devices from said reversible power means and means to reverse said power means from time to time when the registering apparatus indicates that the unbalance is increasing.

22. A balancing mechanism according to claim 1 in which the mechanical devices are levers and movement of the mass in the coordinates by said levers is opposed by means constantly exerting forces on said mass and having registering apparatus registering whether unbalance is increasing or diminishing, reversible power means, means selectively to operate the first and second actuating devices from said reversible power means and means to reverse said power means from time to time when the registering apparatus indicates that the unbalance is increasing.

23. A balancing mechanism according to claim 22 in which the actuating devices outside of said system include levers.

24. A balancing mechanism according to claim 23 in which the rotational slipping connections include annular concentric members one in contact with the first mechanical device and the other in contact with the second mechanical device.

25. A balancing mechanism according to claim 1 in which the actuating devices outside of said system include levers and having registering apparatus registering whether unbalance is increasing or diminishing, reversible power means, means selectively to operate the first and second actuating devices from said reversible power means and means to reverse said power means from time to time when the registering apparatus indicates that the unbalance is increasing.

26. A balancing mechanism according to claim 25 in which the rotational slipping connections include annular concentric members one in contact with the first mechanical device and the other in contact with the second mechanical device.

27. A balancing mechanism according to claim 1 in which the rotational slipping connections include annular concentric members one in contact with the first mechanical device and the other in contact with the second mechanical device and having registering apparatus registering whether unbalance is increasing or diminishing, reversible power means, means selectively to operate the first and second actuating devices from said reversible power means and means to reverse said power means from time to time when the registering apparatus indicates that the unbalance is increasing.

28. A balancing mechanism according to claim 27 in which the rotatable system is reciprocable, said balancing mechanism having also means for reciprocating the rotational slipping connections in harmony with the system when it reciprocates.

29. A balancing mechanism according to claim 1 in which the rotatable system is reciprocable, said balancing mechanism having also means for reciprocating the rotational slipping connections in harmony with the system when it reciprocates and having registering apparatus registering whether unbalance is increasing or diminishing, reversible power means, means selectively to operate the first and second actuating devices from said reversible power means and means to reverse said power means from time to time when the registering apparatus indicates that the unbalance is increasing.

30. A balancing mechanism according to claim 29 in which the mechanical devices are levers and movement of the mass in the coordinates by said levers is opposed by means constantly exerting forces on said mass.

31. A balancing mechanism according to claim 1 having registering apparatus registering whether unbalance is increasing or diminishing, reversible power means, means selectively to operate the first and second actuating devices from said reversible power means and means to reverse said power means from time to time when the registering apparatus indicates that the unbalance is increasing.

32. A balancing mechanism for rotating elements comprising a rotatable system, a movable mass in said system movable radially to change the balance of said system, a mechanical device in said system connected to move said mass radially, an axially movable connection in said system connected to said mechanical device, an actuating device outside of said system and non-rotating with respect to said system, a collar connected to the actuating device and a bearing connected to the axially movable connection, said collar being supported by said bearing, whereby from a non-movable station outside of the system the mass can be moved radially in the system while the system is rotating.

33. A balancing mechanism according to claim 32 in which the mechanical device is a lever and movement of the mass radially by said lever is opposed by means constantly exerting force on said mass.

34. A balancing mechanism according to claim 33 in which the connection between said axially movable connection and said mechanical device is an annular concentric member.

35. A balancing mechanism according to claim 34 in which the actuating device outside of said system is a lever connected to said collar connected to the actuating device.

36. A balancing mechanism according to claim 32 in which the connection between said axially movable connection and said mechanical device is an annular concentric member.

37. A balancing mechanism according to claim 36 in which the actuating device outside of said system is a lever connected to said collar connected to the actuating device.

38. A balancing mechanism according to claim 32 in which the actuating device outside of said system is a lever connected to said collar connected to the actuating device.

39. A balancing mechanism according to claim 38 in which the mechanical device is a lever and movement of the mass radially by said lever is opposed by means constantly exerting force on said mass.

References Cited in the file of this patent

UNITED STATES PATENTS

| | | |
|---|---|---|
| 1,876,526 | Thearle | Sept. 6, 1932 |
| 1,876,527 | Thearle | Sept. 6, 1932 |
| 2,142,021 | Ernst | Dec. 27, 1938 |
| 2,241,637 | Ernst | May 13, 1941 |

FOREIGN PATENTS

| | | |
|---|---|---|
| 674,912 | Great Britain | July 2, 1952 |